Patented Nov. 12, 1940

2,221,029

UNITED STATES PATENT OFFICE 2,221,029

AZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application July 1, 1939, Serial No. 282,529

9 Claims. (Cl. 260—206)

This invention relates to azo dyes and to textile materials colored therewith. More particularly it relates to azo compounds having the general formula:

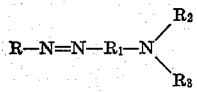

wherein R represents a member selected from the group consisting of a benzene nucleus, an azobenzene nucleus, a diphenyl nucleus, a naphthalene nucleus, and an anthraquinone nucleus; $R_1$ represents a member selected from the group consisting of a benzene nucleus, and a naphthalene nucleus, the said nucleus $R_1$ containing in its molecule in position other than para with respect to the azo group at least once the grouping —$OR_4$—$SO_3Z$, wherein $R_4$ represents an alkylene group of two or more carbon atoms, and Z represents a member selected from the group consisting of hydrogen, a nitrogen base, and an alkali forming metal, and $R_2$ and $R_3$ each represent a member selected from the group consisting of hydrogen, an alkyl group, a hydroxyalkyl group, an alkoxyalkyl group, a cycloalkyl group, a sulphoalkyl group, an alkylene group, a heterocyclic group, and a phenyl group.

It should be noted that while the invention is primarily concerned with the monoazo compounds, polyazo compounds are likewise included within the scope of our invention as will be more fully apparent hereinafter. R in the above formula, for example, may be an aromatic component containing an azo bond such as an aminoazobenzene and alkyl, alkoxy, hydroxyalkyl, hydroxyalkoxy, halogen, and nitro substituted aminoazobenzenes.

It is an object, therefore, of our invention to prepare the class of dyestuffs above described and to color organic derivatives of cellulose and particularly cellulose acetate, silk and wool in the form of threads, yarns, filaments and fabric materials therewith.

The azo compounds of our invention may be prepared by coupling the diazo salts of various suitable arylamines belonging to the benzene, naphthalene, and anthraquinone series with aryl coupling components represented by the general formula:

wherein $R_1$, $R_2$, and $R_3$ each have the meanings previously defined. The above described coupling intermediates may be obtained by the processes illustrated below, although it should be understood that we do not intend to restrict ourselves to the specific examples shown, since these methods are applicable for the preparation in general of all the intermediates disclosed in our invention. For example, we may use as the starting material in Process A, 2,5-dichloro-nitrobenzene designated (I) in the diagram below and condense it with a sodium alkylate having the general formula $NaOR_4SO_3Z$, to form the monosubstituted compound (II) or the disubstituted compound if two or more equivalents of the sodium alkylate are used, which may be reduced to the corresponding amino compounds (III), and the latter may then be converted by alkylation and/or arylation of the amino groups to the desired intermediates (IV).

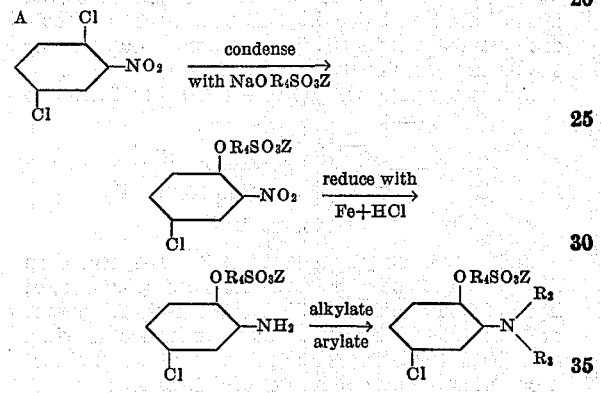

wherein $R_2$, $R_3$, $R_4$, and Z have the meanings already defined. In place of 2,5-dichloro-nitrobenzene there may be used ortho-, and meta-chloronitrobenzenes and their various hydroxy, halogen, alkyl, alkoxy, aryl, and amino substituted products excluding compounds substituted in the para position to the nitro group. In place of the above named compounds there may be substituted the equivalent alpha nitronaphthalenes.

In process B, the starting material may be a nitro substituted sodium phenylate designated below as (I) which is condensed with a halogen compound having the general formula

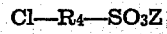

to form the alkoxy derivatives (II) which may be reduced to the corresponding amino compounds (III), and the latter may then be converted by alkylation and/or arylation of the amino groups to the desired intermediates (IV).

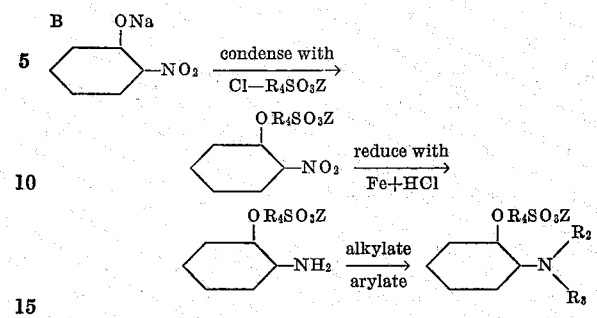

wherein $R_2$, $R_3$, $R_4$, and $Z$ have the meanings already defined. In place of o-nitro sodium phenylate there may be used m-nitro sodium phenylate, and the various —ONa, hydroxy halogen, alkyl, alkoxy, aryl, and amino substituted products of ortho-, and meta- nitro sodium phenylates, excepting the compounds substituted in the para position to the nitro group. In place of the above mentioned compounds there may be used the corresponding nitro sodium naphthylates.

The following examples illustrate the preparation of the compounds of our invention.

Example 1

12.8 grams of o-chloroaniline are dissolved in 150 grams of ice and water containing 25 c. c. of hydrochloric acid and diazotized with 6.9 grams of sodium nitrite. The diazo solution is then added to 22.5 grams of meta-sodium sulphoethoxy aniline dissolved in 100 c. c. of water containing 22 c. c. of hydrochloric acid. The coupling reaction is completed by neutralizing the reaction mixture with sodium bicarbonate using litmus indicator, after which the dye is salted out, filtered and dried. Cellulose acetate is colored yellow shades from an aqueous solution or suspension of the dye.

The azo compound obtained has the formula:

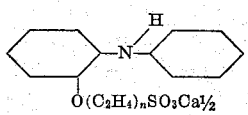

Example 2

13.8 grams of p-nitroaniline are suspended in 200 grams of ice and water containing 30 c. c. of hydrochloric acid and diazotized with 6.9 grams of sodium nitrite. The diazo mixture is then added with stirring to a solution of 0.1 mole of a compound having the general formula:

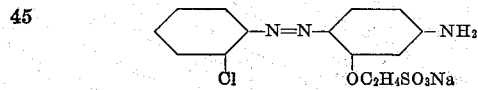

wherein $n$ represents an integer, the latter solution being prepared by dissolving the above type of compound in acetic acid and adding an excess of sodium acetate. When the coupling reaction is complete, water is added and the dye salted out, filtered and dried. Cellulose acetate is colored red shades from an aqueous suspension of the dye.

Example 3

13.5 grams of p-aminoacetophenone are diazotized as described in Example 1 and coupled with 43.0 grams of 2-sulpho-propoxy-5-methyl-cyclohexyl tetrahydrofurfuryl-aminobenzene dissolved in a well iced dilute hydrochloric acid solution. The reaction mixture is made neutral to Congo paper with sodium acetate, and when coupling is complete, the dye is salted out, filtered and dried. Cellulose acetate is colored red shades from an aqueous solution or suspension of the dye.

The azo compound obtained has the formula:

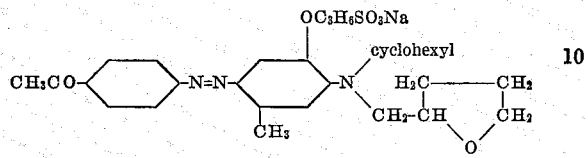

Example 4

18.0 grams of m-nitro-p-amino acetophenone are suspended in 200 grams of ice and water containing 30 c. c. of hydrochloric acid and diazotized with 6.9 grams of sodium nitrite. This solution is then added to an equivalent amount of 3 - sodium sulphobutoxy - butyl-ω-hydroxypolyethoxy-ethylaminobenzene dissolved in dilute hydrochloric acid. The mixture is neutralized with sodium carbonate using litmus indicator, and when the coupling reaction is completed, the dye is salted out, filtered and dried. Cellulose acetate is colored red shades from aqueous solutions of the dye.

The azo compound produced has the formula:

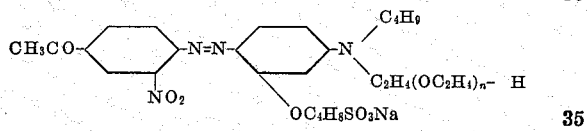

wherein $n$ is a whole number 1, 2, 3, etc.

Example 5

(A) 7.6 grams of sodium nitrite are dissolved in 53 c. c. of sulfuric acid, the solution is warmed to a temperature not exceeding 70° C., and then cooled to 10–15° C.

(B) 26.2 grams of 2,4-dinitro-6-bromoaniline are dissolved in 250 c. c. of hot acetic acid and cooled rapidly to 10–15° C. Solution (B) is then added to (A) with stirring over a period of 30 minutes, meanwhile maintaining the temperature at 10–15° C. After the addition, the mixture is stirred until the diazotization reaction is complete, after which there is added one gram of urea.

The diazo solution prepared as above is then slowly added with stirring to 31.0 grams of 6-methoxy-2-sodium sulphoethoxy-β-hydroxyethylaminobenzene dissolved in a mixture of ice and water. Concurrently with the addition of the diazo solution, there is added a solution of sodium carbonate at such a rate that the reaction mixture is only slightly acid to Congo red indicator. When the reaction is complete, the dye is salted out, filtered and dried. Cellulose acetate is colored purple shades from an aqueous suspension or solution of the dye.

The azo compound obtained has the formula:

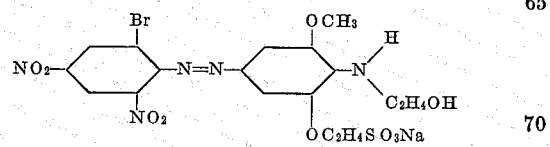

Example 6

29.0 grams of 2,4-dinitro-6-sulfonethylamide aminobenzene are diazotized and coupled with 34.0 grams of β-sodium sulpho-ethoxy-α-diethylamino naphthalene following the procedure described in Example 5. Cellulose acetate is colored blue shades from aqueous solutions or suspensions of the dye.

The azo compound obtained has the formula:

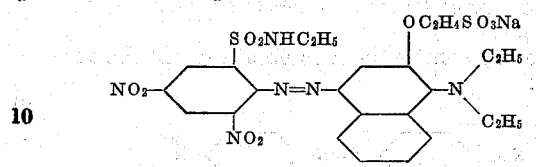

In place of β-sodium sulphoethoxy-α-diethylamino naphthalene there may be substituted an equivalent quantity of 5-hydroxy-2-sodium sulphoethoxy-α-diethylamino naphthalene.

EXAMPLE 7

7.3 grams of sodium nitrite are dissolved in 62 c. c. of concentrated sulphuric acid, the solution cooled at 22.8 grams of 2,4,6-trinitroaniline added. The suspension is cooled and stirred for one hour, followed by further stirring at room temperature for an additional 12 hours. The diazo solution prepared as above is then added to an aqueous solution of 29.5 grams of 3-sodium sulphoethoxy-6-methyl-ethyl methyl aniline. Concurrently with the addition of the diazo solution, there is added a solution of sodium carbonate at such a rate that the mixture is only slightly acid to Congo red indicator. Cellulose acetate is colored blue shades from aqueous solutions or suspensions of the dye.

The azo compound obtained has the formula:

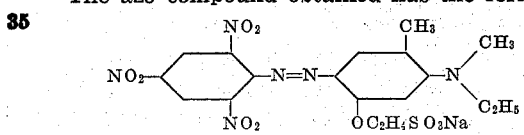

In place of 3-sodium sulphoethoxy-6-methylethyl methylaniline there may be used equivalent quantities of 3-sodium sulphoethoxy-6-methoxyethyl methyl aniline, and 2-sodium sulphoethoxy-3-methyl-ethyl methylaniline.

EXAMPLE 8

19.8 grams of p-aminoazobenzene are suspended in 200 c. c. of water containing 30 c. c. of hydrochloric acid and diazotized with 6.9 grams of sodium nitrite at approximately 20° C. 33 grams of 3-chloro-6-sodium sulphoethoxy-diethylaniline are then dissolved in acetic acid and the diazo solution prepared above is added. The mixture is made neutral to Congo red indicator with sodium acetate, and when the coupling is complete, water is added, and the dye is salted out, filtered and dried. Cellulose acetate is colored orange-red shades from aqueous solutions or suspensions of the dye.

The diazo compound obtained has the formula:

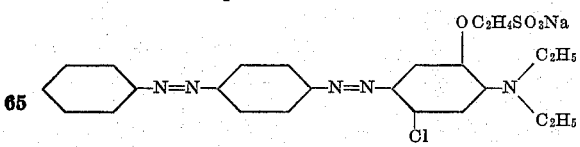

EXAMPLE 9

24.4 grams of dianisidine are dissolved in hot concentrated hydrochloric acid, the solution poured into crushed ice, and diazotized with 13.8 grams of sodium nitrite. The diazo solution is then coupled with 82 grams of 5-methoxy-2-sodium sulphoethoxy-1-ethyl methoxyethylamino naphthalene in the manner described in Example 5. Cellulose acetate is colored bluish-red shades from aqueous suspensions of the dye.

The azo compound obtained has the formula:

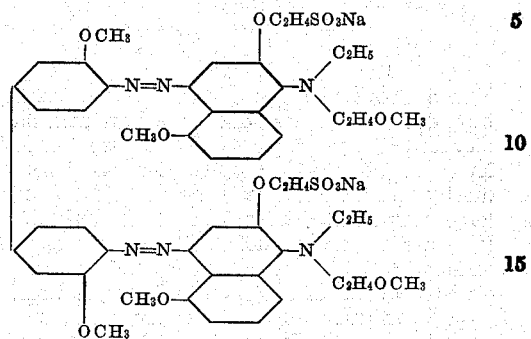

EXAMPLE 10

18.8 grams of 4-nitro-1-naphthylamine are diazotized in 200 c. c. of water containing 30 c. c. of hydrochloric acid with 6.9 grams of sodium nitrite, and coupled with 41.0 grams of 2,6-di-sodium sulphoethoxy-dimethylaniline following the procedure described in Example 5. Cellulose acetate is colored rubine shades from aqueous solutions of the dye.

The azo compound obtained has the formula:

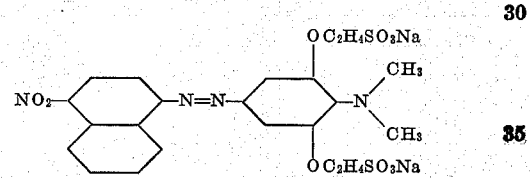

EXAMPLE 11

25.0 grams of 1-amino-4-methylaminoanthraquinone are suspended in 110 grams of 10% sulphuric acid and diazotized with 34.0 grams of sodium nitrite. 41.0 grams of 5-methoxy-2-sodium sulphoethoxy-1-ethyl methoxyethylamino naphthalene are dissolved in water and the coupling reaction accomplished in the manner described in Example 5. Cellulose acetate is colored blue shades from aqueous suspensions of the dye.

The azo compound obtained has the formula:

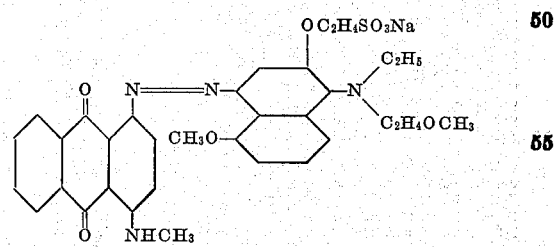

Another process for preparing the azo compounds of our invention employs an azo compound as the starting material. The following example illustrates the application of this process.

EXAMPLE 12

31.4 grams of 4-(4'-nitrophenyl-azo-)-5-hydroxy-diethylaniline are dissolved in dilute sodium hydroxide. One gram of active copper is then added with 30 grams of β-bromoethanesulfonate. The reaction mixture is refluxed for 10 hours, and the dye salted out, filtered and dried. Cellulose acetate is colored red shades from aqueous solutions or suspensions of the dye.

The azo compound thus obtained has the formula:

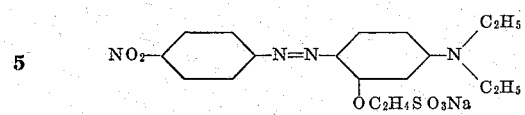

The above procedure may advantageously be modified to run the reaction in an autoclave at elevated temperature and pressure conditions. In place of 4-(4'-nitrophenyl-azo-)-5-hydroxy-diethylaniline there may be substituted equivalent quantities of other azo compounds of similar kind which contain both a hydroxyl group and an amino or alkyl substituted amino group on the nucleus of the same benzene radical.

Still another process of preparing the azo compounds of our invention is illustrated by the following example.

EXAMPLE 13

43.0 grams of 4-(4'-nitro-2'-chlorophenyl-azo-)-3-bromo-ethoxy-dimethylaniline are dissolved in boiling butanol. There is then added dropwise with stirring a butanol solution of 11.0 grams of sodium bisulfite over a period of 15 hours. The dye is recovered by concentrating the butanol solution and colors cellulose acetate rubine shades from its aqueous solutions or suspensions.

The azo compound thus obtained has the formula:

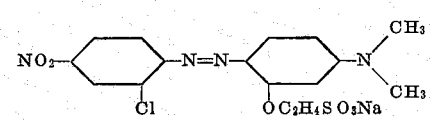

The invention is further illustrated by reference to the following table wherein the compound under the heading "Amine" is diazotized and coupled with an equivalent quantity of the specified compound appearing in the column entitled "Coupling component," the dye resulting therefrom coloring cellulose acetate the shades designated.

Table

| Amine | Coupling component | Shade on cellulose acetate |
|---|---|---|
| o-Chloroaniline | (1) 3-β-sodium sulphoethoxy-aniline | Yellow. |
| Do | (2) 2-β-sodium sulphoethoxy ethoxy-phenylaminobenzene | Do. |
| Do | (3) 2-ω-sodium sulphopoly-ethoxy-phenylaminobenzene | Do. |
| Do | (4) 3-sulphopropoxy-6-methyl-cyclohexyl tetrahydrofurfuryl aminobenzene. | Do. |
| Do | (5) 2-sulphobutoxy-β-hydroxy-ethyldecyl aminobenzene | Do. |
| Do | (6) 2-β-ammonium sulphoethoxy-6-methoxy-β-hydroxyethoxy-ethyl butyl aminobenzene. | Do. |
| Do | (7) 2-β-ammonium sulphoethoxy-6-methoxy-ω-hydroxypoly-ethoxy-ethyl butylaminobenzene. | Do. |
| Do | (8) 2-sodium sulphopropoxy-6-ethyl-di-β-hydroxyethoxy-ethyl aminobenzene. | Do. |
| Do | (9) 2-sodium sulphopropoxy-6-ethyl-di-ω-hydroxypolyethoxy-ethyl-aminobenzene. | Do. |
| Do | (10) 2-β-sodium sulphoethoxy-5-methyl-allylethylaminobenzene | Do. |
| Do | (11) 2-β-sodium sulphoethoxy-5-chloro-diethylaminobenzene | Do. |
| Do | (12) 3,5-di-β-sodium sulphoethoxy-dimethylaminobenzene | Do. |
| Do | (13) 2-β-sodium sulphoethoxy-1-diethylaminonaphthalene | Orange. |
| p-Nitroaniline | Couplers 1–13 | Red to bluish-red. |
| p-Nitro-o-chloroaniline | Couplers 1–12 | Rubine. |
| p-Nitro-o-bromoaniline | do | Do. |
| p-Nitro-o-fluoroaniline | do | Do. |
| p-Nitro-2,6-dichloroaniline | do | Brown-rubine. |
| p-Nitro-2,6-dibromoaniline | do | Do. |
| p-Nitro-2,6-difluoroaniline | do | Do. |
| p-Nitro-o-methyl aniline | do | Red. |
| p-Nitro-o-methoxyaniline | do | Do. |
| p-Nitro-o-phenyl aniline | do | Do. |
| o-Nitro-p-methylaniline | do | Orange-red to red. |
| o-Nitro-p-methoxyaniline | do | Do. |
| o-Nitro-p-chloroaniline | do | Do. |
| o-Nitro-p-bromoaniline | do | Do. |
| o-Nitro-p-fluoroaniline | do | Do. |
| o-Nitro-p-hydroxyaniline | Couplers 1–13 | Orange. |
| p-Nitro-o-hydroxyaniline | do | Red to bluish-red. |
| o-Nitro-p-amino acetophenone | Couplers 1–12 | Rubine. |
| 2-amino-5-nitro benzamide | do | Do. |
| 2-amino-5-nitro methylbenzoate | do | Do. |
| 2-amino-5-nitro benzoic acid | do | Do. |
| 3-nitro-4-aminobenzoic acid | do | Orange-red to red. |
| 2-amino-5-nitro-phenyl methyl sulfone | do | Rubine to violet. |
| 2,4-dinitroaniline | do | Purple to violet. |
| 2,4,-dinitro-6-chloroaniline | Couplers 1–13 | Red-blue to blue. |
| 2,4,-dinitro-6-bromoaniline | do | Do. |
| 2,4,-dinitro-6-fluoroaniline | do | Do. |
| 3,5-dinitro-4-amino acetophenone | do | Rubine to blue. |
| 2,4,6-trinitroaniline | do | Violet to blue. |
| p-Amino-m-chloroacetophenone | Couplers 1–12 | Orange red to red. |
| p-Amino-m-bromoacetophenone | do | Do. |
| p-Amino-m-fluoroacetophenone | do | Do. |
| p-Amino-m-iodoacetophenone | do | Do. |
| p-Amino acetophenone | do | Orange to red. |
| p-Aminoazobenzene | do | Rubine. |
| 4-nitro-alpha-naphthylamine | Couplers 1–13 | Purple-red to violet. |
| 1-amino-4-methylamino anthraquinone | do | Do. |

Since many of the dyes of our invention are water-soluble, they may be used for the direct coloration of organic derivatives of cellulose, silk and wool and particularly cellulose acetate in the form of threads, yarns, filaments, and fabric materials without the necessity of employing a dispersing or solubilizing agent. The dyeing operation will be conducted in accordance with the usual dyeing practice, salt being added if desired to facilitate exhaustion of the dye bath. For a more detailed description as to how the water-soluble azo dyes of our invention may be empolyed for the coloration of textile materials, reference may be had to our U. S. Patent No. 2,107,898, issued February 8, 1938.

In the case where the dyes of our invention are but slightly soluble in water, their application to coloring cellulose acetate or material containing cellulose acetate, silk, wool, and cotton, will ordinarily follow the procedure of grinding the azo dye compound to a paste with soap, sulfonated oil, or other colloidizing agent, and dispersing the resulting paste in water. The material to be colored is immersed in the dispersion thus prepared and heated to a temperature approximately 45–55° C., after which the dye bath temperature is raised gradually to 80–85° C., and maintained at this point for several hours. Sodium chloride may be added if desired during the dyeing operation to promote exhaustion of the dye bath. Upon completion of the dyeing operation, the textile material is removed from the dye bath, washed with soap, rinsed and dried.

The term "organic derivatives of cellulose" is intended to include the unhydrolyzed as well as the hydrolyzed cellulose organic acid esters and cellulose mixed organic acid esters such as cellulose formate, cellulose acetate, cellulose propionate, cellulose butyrate, cellulose acetate-propionate, cellulose acetate-butyrate, and cellulose ethers such as methyl cellulose, ethyl cellulose, and benzyl cellulose.

We claim:

1. The azo compounds having the general formula:

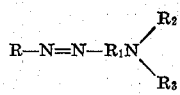

wherein R represents a member selected from the group consisting of a benzene nucleus, a naphthalene nucleus, an azobenzene nucleus, and an anthraquinone nucleus, $R_1$ represents a member selected from the group consisting of a benzene nucleus, and a naphthalene nucleus, the said nucleus $R_1$ containing in its molecule in position other than para with respect to the azo group at least once the grouping $-OR_4SO_3Z$, wherein $R_4$ represents an alkylene group of two or more carbon atoms, and Z represents a member selected from the group consisting of hydrogen, a nitrogen base group, and an alkali forming metal, and $R_2$ and $R_3$ each represent a member selected from the group consisting of hydrogen, an alkyl group, a hydroxyalkyl group, an alkoxyalkyl group, a cycloalkyl group, a sulphoalkyl group, an alkylene group, a furyl group, and a phenyl group.

2. The azo compounds having the general formula:

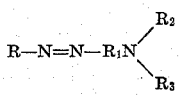

wherein R represents a member selected from the group consisting of a benzene nucleus, a naphthalene nucleus, an azobenzene nucleus, and an anthraquinone nucleus, $R_1$ represents a benzene nucleus containing in its molecule in position other than para with respect to the azo group at least once the grouping $-OR_4SO_3Z$, wherein $R_4$ represents an alkylene group of two or more carbon atoms, and Z represents a member selected from the group consisting of hydrogen, a nitrogen base group, and an alkali forming metal, and $R_2$ and $R_3$ each represent a member selected from the group consisting of hydrogen, an alkyl group, a hydroxyalkyl group, an alkoxyalkyl group, a cycloalkyl group, a sulphoalkyl group, an alkylene group, a furyl group, and a phenyl group.

3. The azo compounds having the general formula:

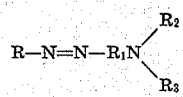

wherein R represents a benzene nucleus, $R_1$ represents a member selected from the group consisting of a benzene nucleus, and a naphthalene nucleus, the said nucleus $R_1$ containing in its molecule in position other than para with respect to the azo group at least once the grouping

wherein $R_4$ represents an alkylene group of two or more carbon atoms, and Z represents a member selected from the group consisting of hydrogen, a nitrogen base group, and an alkali forming metal, and $R_2$ and $R_3$ each represent a member selected from the group consisting of hydrogen, an alkyl group, a hydroxy-alkyl group, an alkoxyalkyl group, a cycloalkyl group, a sulpho-alkyl group, an alkylene group, a furyl group, and a phenyl group.

4. The azo compounds having the general formula:

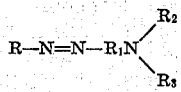

wherein R represents a benzene nucleus, $R_1$ represents a benzene nucleus containing in its molecule in position other than para with respect to the azo group at least once the grouping

wherein $R_4$ represents an alkylene group of two or more carbon atoms, and Z represents a member selected from the group consisting of hydrogen, a nitrogen base group, and an alkali forming metal, and $R_2$ and $R_3$ each represent a member selected from the group consisting of hydrogen, an alkyl group, a hydroxyalkyl group, an alkoxyalkyl group, a cycloalkyl group, a sulphoalkyl group, an alkylene group, a furyl group, and a phenyl group.

5. The azo compounds having the general formula:

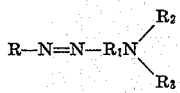

wherein R represents a benzene nucleus containing in positions ortho or para to the azo group at least one nitro group, $R_1$ represents a benzene nucleus containing in its molecule in position other than para with respect to the azo group at least once the grouping $-OR_4SO_3Z$, wherein $R_4$ represents an alkylene group of two or more carbon atoms, and Z represents a member selected from the group consisting of hydrogen, a nitrogen base group, and an alkali forming metal, and $R_2$ and $R_3$ each represent a member selected from the group consisting of hydrogen, an alkyl group, a hydroxy-alkyl group, an alkoxyalkyl group, a cycloalkyl group, a sulphoalkyl group, an alkylene group, a furyl group, and a phenyl group.

6. Material made of or containing an organic derivative of cellulose colored with a dye selected from the class of azo compounds having the general formula:

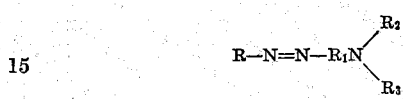

wherein R represents a member selected from the group consisting of a benzene nucleus, a naphthalene nucleus, an azobenzene nucleus, and an anthraquinone nucleus, $R_1$ represents a member selected from the group consisting of a benzene nucleus, and a naphthalene nucleus, the said nucleus $R_1$ containing in its molecule in position other than para with respect to the azo group at least once the grouping $-OR_4SO_3Z$, wherein $R_4$ represents an alkylene group of two or more carbon atoms, and Z represents a member selected from the group consisting of hydrogen, a nitrogen base group, and an alkali forming metal, and $R_2$ and $R_3$ each represent a member selected from the group consisting of hydrogen, an alkyl group, a hydroxyalkyl group, an alkoxyalkyl group, a cycloalkyl group, a sulphoalkyl group, an alkylene group, a furyl group, and a phenyl group.

7. Material made of or containing cellulose acetate colored with a dye selected from the class of azo compounds having the general formula:

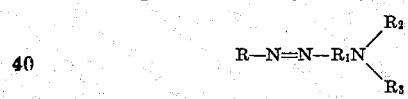

wherein R represents a member selected from the group consisting of a benzene nucleus, a naphthalene nucleus, an azobenzene nucleus, and an anthraquinone nucleus, $R_1$ represents a member selected from the group consisting of a benzene nucleus, and a naphthalene nucleus, the said nucleus $R_1$ containing in its molecule in position other than para with respect to the azo group at least once the grouping $-OR_4SO_3Z$, wherein $R_4$ represents an alkylene group of two or more carbon atoms, and Z represents a member selected from the group consisting of hydrogen, a nitrogen base group, and an alkali forming metal, and $R_2$ and $R_3$ each represent a member selected from the group consisting of hydrogen, an alkyl group, a hydroxyalkyl group, an alkoxyalkyl group, a cycloalkyl group, a sulphoalkyl group, an alkylene group, a furyl group, and a phenyl group.

8. Material made of or containing an organic derivative of cellulose colored with a dye selected from the class of azo compounds having the general formula:

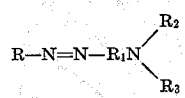

wherein R represents a benzene nucleus, $R_1$ represents a benzene nucleus containing in its molecule in position other than para with respect to the azo group at least once the grouping

wherein $R_4$ represents an alkylene group of two or more carbon atoms, and Z represents a member selected from the group consisting of hydrogen a nitrogen base group, and an alkali forming metal, and $R_2$ and $R_3$ each represent a member selected from the group consisting of hydrogen, an alkyl group, a hydroxyalkyl group, an alkoxyalkyl group, a cycloalkyl group, a sulphoalkyl group, an alkylene group, a furyl group, and a phenyl group.

9. Material made of or containing cellulose acetate colored with a dye selected from the class of azo compounds having the general formula:

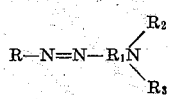

wherein R represents a benzene nucleus, $R_1$ represents a benzene nucleus containing in its molecule in position other than para with respect to the azo group at least once the grouping

wherein $R_4$ represents an alkylene group of two or more carbon atoms, and Z represents a member selected from the group consisting of hydrogen, a nitrogen base group, and an alkali forming metal, and $R_2$ and $R_3$ each represent a member selected from the group consisting of hydrogen, an alkyl group, a hydroxyalkyl group, an alkoxyalkyl group, a cycloalkyl group, a sulphoalkyl group, an alkylene group, a furyl group, and a phenyl group.

JAMES G. McNALLY.
JOSEPH B. DICKEY.